United States Patent Office 2,840,573
Patented June 24, 1958

2,840,573

18-OXYGENATED ALLOPREGNANES

Neal L. McNiven, Shrewsbury, Mass., assignor to G. D. Searle & Co., Chicago, Ill., a corporation of Delaware No Drawing. Application February 18, 1957
Serial No. 640,581

9 Claims. (Cl. 260—397.1)

The present invention relates to steroidal compounds oxygenated at position 18. It is particularly concerned with compounds of the general structural formula

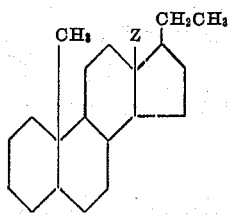

in which formula Z can represent a hydroxymethyl (—CH$_2$OH) group, a formyl (—CHO) group, an acyloxymethyl (—CH$_2$O-acyl) group, a carboxyl group, or a carboxylic acid ester group. When Z represents an acyloxymethyl group, preferred embodiments are those in which the acyl radical is the acyl radical of a hydrocarbon carboxylic acid having fewer than nine carbon atoms. Representative of such acyl radicals are lower alkanoyl radicals, as formyl, acetyl, propionyl, butyryl, valeryl, hexanoyl, heptanoyl, octanoyl, and branched-chain isomers thereof. Other acyl radicals included as preferred embodiments are cyclic acyl radicals such as cyclopentanecarbonyl, cyclohexanecarbonyl, cyclopentaneacetyl, cyclopentanepropionyl, cyclohexaneacetyl, benzoyl, ethylbenzoyl, phenylacetyl, and homologs and isomers of the foregoing. When Z represents a carboxylic acid ester group, preferred embodiments are lower alkoxycarbonyl groups having the formula —COO-(lower) alkyl Useful starting materials for the manufacture of the compositions of this invention are 18-aminoallopregnane and 18-methylaminoallopregnane, also known as N-demethylhexahydroapoconessine. These compounds are described in the Journal of the Chemical Society, 1953, 1123. In accordance with the disclosures of the present invention, when 18-aminoallopregnane is heated in a reaction mixture having a pH of about 4 to 5 and comprising hexamethylenetetramine, aqueous formaldehyde, a mineral acid such as hydrochloric acid, an alkali metal acetate such as sodium acetate, and acetic acid, there is achieved a conversion to the aldehyde, 18-oxoallopregnane. This aldehyde affords a semicarbazone having a melting point of about 231–233° C. The semicarbazone is transformed into the known compound, allopregnane, by heating it with potassium hydroxide in diethylene glycol solution. The same 18-oxoallopregnane is obtained by the substitution of 18-methylaminoallopregnane for the 18-aminoallopregnane in the reaction mixture described hereinbefore, although for maximum yield and greater convenience of operation, use of 18-aminoallopregnane is recommended. Unless thoroughly purified by repeated crystallization from organic solvents or by fractionation on a silica gel chromatography column, the aldehyde as obtained in these operations contains a minor amount of the corresponding carboxylic acid, 18-allopregnanoic acid. Exhaustive purification of the aldehyde is not necessary for its successful employment in the intended uses.

By reduction of 18-oxoallopregnane with an alkali metal hydride such as sodium borohydride or lithium aluminum hydride, the compound obtained is 18-hydroxyallopregnane. The corresponding acyloxy derivatives are obtained by treatment of 18-hydroxyallopregnane with acylating agents such as hydrocarbon carboxylic acid anhydrides or hydrocarbon carboxylic acid chlorides. These acylations are suitably conducted in pyridine solution.

18-allopregnanoic acid can be obtained by the oxidation of the corresponding alcohol or the corresponding aldehyde. For example, a good yield of 18-allopregnanoic acid is obtained by the mild oxidation of 18-oxoallopregnane with silver oxide at room temperature. 18-allopregnanoic acid affords alkyl esters of this invention by treatment with a diazoalkane such as diazomethane or diazoethane, or by treatment with a lower alkanol in the presence of a mineral acid catalyst. The compositions of this invention are valuable pharmacological agents. They are useful in increasing the urinary excretion of sodium. They are highly effective in inhibiting the salt retention caused by the administration of adrenocortical hormones. Their suitability for this purpose can be demonstrated by the fact that upon co-administration with desoxycorticosterone, they markedly reduce or substantially abolish the salt-retaining effect produced by the latter hormone.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.) and quantities of materials in parts by weight.

*Example 1*

A solution is prepared from 9.1 parts of 18-aminoallopregnane, 6.3 parts of hexamethylenetetramine, 12 molar hydrochloric acid containing a total of 1.1 parts of hydrogen chloride, 2.7 parts of 37% formaldehyde, 30 parts of water, 46 parts of sodium acetate and 525 parts of acetic acid. The resulting homogeneous solution is found to have a pH of about 5. It is heated under reflux in a nitrogen atmosphere for ten hours, following which the cooled mixture is diluted with 12 molar hydrochloric acid containing a total of 26.3 parts of hydrogen chloride, and with 600 parts of water. The resulting mixture is extracted with several portions of mehtylene chloride. The methylene chloride extract is washed with dilute sodium bicarbonate solution rendered anhydrous over sodium sulfate, and concentrated to dryness. Upon recrystallization of the non-volatile residue from methanol there is obtained 18-oxoallopregnane which melts at about 106–109° C. and which exhibits infrared absorption maxima at about 3.66 and 5.82 microns. The structural formula is

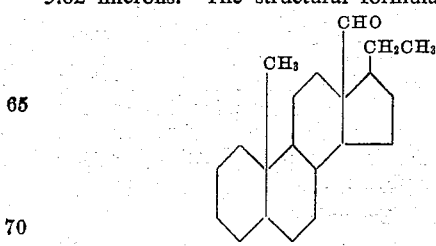

The same 18-oxoallopregnane is obtained by the substitution of 18-methylaminoallopregnane for the 18- aminoallopregnane in the foregoing procedure, followed by passing a methanolic solution of the crude product through a cation exchange column and recrystallizing the neutral fraction from methanol.

Example 2

A solution of 7.6 parts of 18-oxoallopregnane in 1000 parts of 95% ethanol is treated with 10 parts of sodium borohydride, and the reaction mixture is maintained at about 25° C. for 16 hours. It is then acidified with dilute hydrochloric acid and distilled to dryness under reduced pressure. The residue is extracted with methylene chloride. The methylene chloride solution is filtered from insoluble material, and the filtrate is brought to dryness by vaporization of the solvent. Upon recrystallization of the residue from acetone there is obtained 18-hydroxyallopregnane. This compound melts at about 117–117.5° C., and has a specific rotation of about +23° in chloroform solution. A prominent infrared absorption maximum appears at about 2.94 microns. The structural formula is:

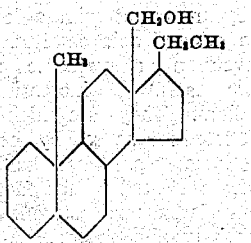

Example 3

A solution of 2 parts of 18-hydroxyallopregnane, 10 parts of pyridine and 5 parts of acetic anhydride is maintained at about 25° C. for 24 hours, and is then diluted with several times its volume of ice water. The precipitated product is washed by decantation with water and dissolved in benzene. When the benzene solution is rendered anhydrous and concentrated to dryness, there is obtained a residue of 18-acetoxyallopregnane. This compound exhibits prominent infrared absorption maxima at about 5.75 and 8.08 microns.

By the foregoing procedure, with the substitution of 5 parts of propionic anhydride for the acetic anhydride, the compound obtained is 18-propionoxyallopregnane.

Example 4

A mixture of 2 parts of 18-hydroxyallopregnane, 20 parts of pyridine, and 1.5 parts of benzoyl chloride is allowed to stand with occasional stirring, at about 25° C. for 48 hours. The reaction product precipitated by dilution of the mixture with ice water is collected and washed with water. Upon purification by chromatography on a silica gel column or by crystallizations from acetone there is obtained 18-benzoyloxyallopregnane which melts at about 89–90° C. and has a specific rotation of about +12° in chloroform solution. This benzoate is reconverted to 18-hydroxyallopregnane by hydrolysis in a methanolic solution of potassium hydroxide.

Example 5

To a solution of 2 parts of 18-hydroxyallopregnane in 25 parts of pyridine is added 2 parts of β-cyclopentylpropionyl chloride. The mixture is maintained at about 25° C. for 48 hours, and is then diluted with several times its volume of water. The precipitated product is washed by decantation with water and then dissolved in benzene. When the benzene solution is rendered anhydrous and concentrated to dryness by vaporization of the solvent, it affords a residue of crude 18-cyclopentylpropionoxyallopregnane.

Example 6

A solution of 9 parts of 18-oxoallopregnane in 620 parts of benzene is stirred with silver oxide (freshly prepared from 51 parts of silver nitrate) at about 25° C. for 16 hours. An excess of hydrochloric acid is added and the mixture is filtered. The benzene solution is then washed with water, rendered anhydrous, and concentrated to dryness by vaporization of the solvent. Upon crystallization of the residue from methanol and from mixtures of ether and petroleum ether, there is obtained 18-allopregnanoic acid which melts at about 271–273° C. and has a specific rotation of about +34° in dioxane solution. This compound has the structural formula

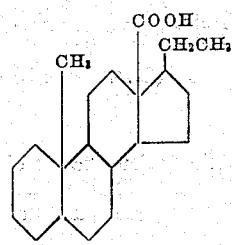

The infrared spectrum exhibits a strong carbonyl band at about 5.94 microns. The potassium salt, prepared by reaction with potassium hydroxide, has an absorption maximum at about 6.49 microns, characteristic of carboxylic acid salts.

Example 7

A solution of 4 parts of 18-allopregnanoic acid in 100 parts of ether is treated with an excess of freshly prepared diazomethane. The solution is then evaporated to dryness, and the residue is recrystallized from methanol. The compound thus obtained is the methyl ester of 18-allopregnanoic acid (18-methoxycarbonylallopregnane). This compound melts at about 108–108.5° C. and has a specific rotation of about +17° in chloroform solution.

What is claimed is:

1. A compound of the structural formula

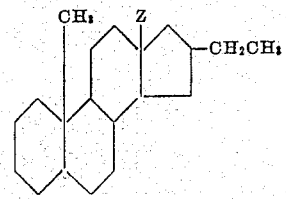

wherein Z is a member of the class consisting of hydroxymethyl, formyl, carboxyl, and (lower) alkoxycarbonyl groups, and groups of the formula

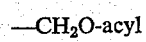

—CH₂O-acyl wherein the acyl radical is the acyl radical of a hydrocarbon carboxylic acid having fewer than nine carbon atoms.

2. 18-oxoallopregnane.
3. 18-hydroxylallopregnane.
4. A compound of the structural formula

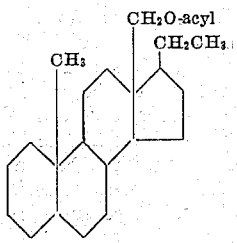

wherein the acyl radical is the acyl radical of a hydrocarbon carboxylic acid having fewer than nine carbon atoms.

5. 18-(lower)alkanoyloxylallopregnane.
6. 18-acetoxyallopregnane.
7. 18-allopregnanoic acid.
8. A lower alkyl ester of 18-allopregnanoic acid.
9. The methyl ester of 18-allopregnanoic acid.

No references cited.